(12) United States Patent
Bharatiya et al.

(10) Patent No.: US 12,274,195 B2
(45) Date of Patent: Apr. 15, 2025

(54) SYSTEM AND METHOD FOR FEED CONTROL IN A SPREADER

(71) Applicant: DEERE & COMPANY, Moline, IL (US)

(72) Inventors: Paresh Bharatiya, Bettendorf, IA (US); Augustine Y. Chow, Johnston, IA (US); Nilesh Dhavan, Kolhapur (IN); Mandar Mhalsakant Kale, Pune (IN)

(73) Assignee: Deere & Company, Moline, IL (US)

( * ) Notice: Subject to any disclaimer, the term of this patent is extended or adjusted under 35 U.S.C. 154(b) by 878 days.

(21) Appl. No.: 17/448,112

(22) Filed: Sep. 20, 2021

(65) Prior Publication Data

US 2022/0104426 A1  Apr. 7, 2022

(30) Foreign Application Priority Data

Oct. 1, 2020 (IN) .............................. 202021042835

(51) Int. Cl.
*A01C 15/12* (2006.01)
*A01C 21/00* (2006.01)
*B60W 30/14* (2006.01)

(52) U.S. Cl.
CPC .......... *A01C 15/122* (2013.01); *A01C 21/002* (2013.01); *B60W 30/143* (2013.01); *B60W 2300/15* (2013.01)

(58) Field of Classification Search
CPC ... A01C 15/122; A01C 21/002; A01C 17/008; B60W 30/143; B60W 2300/15; B60W 2050/146; B60W 10/30; B60W 50/14; B60W 2520/10; B60W 2720/10; G06Q 50/02

See application file for complete search history.

(56) References Cited

U.S. PATENT DOCUMENTS

| | | | | |
|---|---|---|---|---|
| 10,143,131 | B2 * | 12/2018 | Isaac | A01D 41/127 |
| 2004/0026544 | A1 * | 2/2004 | Williams | E01C 19/203 239/682 |
| 2021/0112701 | A1 * | 4/2021 | Dick | A01C 15/04 |
| 2021/0219487 | A1 * | 7/2021 | Pederson | A01C 19/02 |
| 2022/0104426 | A1 * | 4/2022 | Bharatiya | A01C 17/008 |

FOREIGN PATENT DOCUMENTS

| | | | | |
|---|---|---|---|---|
| AU | 2018201217 | A1 * | 9/2018 | |
| WO | WO-2019157094 | A1 * | 8/2019 | A01C 15/04 |

\* cited by examiner

*Primary Examiner* — Bob Zadeh

(57) ABSTRACT

A feed control system for a spreader includes a section configuration module configured to output a section configuration and a section control module configured to receive the section configuration, determine a first actuator position based on the section configuration, and determine a second actuator position based on the section configuration. The feed control system also includes a belt speed module configured to receive the section configuration, receive a commanded belt speed, and determine a target belt speed based on (i) the section configuration and (ii) the commanded belt speed.

20 Claims, 5 Drawing Sheets

410 →

| Left Section | Right Section | State |
|---|---|---|
| ON | ON | State 1 |
| ON | OFF | State 2 |
| OFF | ON | State 3 |
| OFF | OFF | State 4 |

| Current State | New State | Delay Required | Conveyor OFF |
|---|---|---|---|
| State 1 | State 1 | No | No |
| State 1 | State 2 | No | No |
| State 1 | State 3 | No | No |
| State 1 | State 4 | No | Yes |
| State 2 | State 1 | No | No |
| State 2 | State 2 | No | No |
| State 2 | State 3 | Yes | No |
| State 2 | State 4 | No | Yes |
| State 3 | State 1 | No | No |
| State 3 | State 2 | Yes | No |
| State 3 | State 3 | No | No |
| State 3 | State 4 | No | Yes |
| State 4 | State 1 | No | No |
| State 4 | State 2 | No | No |
| State 4 | State 3 | No | No |
| State 4 | State 4 | No | Yes |

FIG. 4B

SYSTEM AND METHOD FOR FEED CONTROL IN A SPREADER

CROSS-REFERENCE TO RELATED APPLICATIONS

This application claims the benefit of Indian Patent Application No. 202021042835, filed Oct. 1, 2020. The entire disclosure of the application referenced above is incorporated by reference.

FIELD

The present disclosure relates to the control of a spreading system that applies material to an agricultural field, and more particularly to section control of a feed-gate of a spreading apparatus.

BACKGROUND

Agricultural spreading systems are known. Spreading operations are generally intended to distribute a material (e.g. fertilizer, herbicides, pesticides, etc.) over an agricultural surface, such as a field or crop. The material to be applied is held in a bin, and is a dry material, which may be particulate (e.g., granular). A conveyor carries the dry material from the bin to one or more outlets which feed the material onto a distribution device—such as, a spinning disk.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A feed control system for a spreader includes a section configuration module configured to output a section configuration and a section control module configured to receive the section configuration, determine a first actuator position based on the section configuration, and determine a second actuator position based on the section configuration. The feed control system also includes a belt speed module configured to receive the section configuration, receive a commanded belt speed, and determine a target belt speed based on (i) the section configuration and (ii) the commanded belt speed.

In other features, the feed control system includes a ground speed module configured to receive (i) an application rate and (ii) the section configuration and determine and output a ground speed based on the (i) the application rate and (ii) the section configuration. The feed control system also includes an operator interface that includes a display. The operator interface in configured to receive the determined ground speed and present the speed as a suggested speed on the display.

In further features, the ground speed module is configured to adjust a travel speed of the spreader by providing the determined ground speed to a vehicle control system of the spreader or a cruise control system of the spreader.

In other features, the section configuration module is configured to receive (i) a first input and (ii) a second input and generate the section configuration based on (i) the first input and (ii) the second input. In further features, the first input is a manual section input and the second input is an automated section input.

In yet other features, the section configuration module is configured to receive (i) a first input and (ii) a second input. The section configuration module is also configured to, in response to determining that the first input indicates that (i) the spreader is in an application mode or (ii) a bin of the spreader is not empty, generate the section configuration based on the second input.

In other features, the spreader includes a first actuator and a second actuator. The feed control system further includes a first actuator module configured to receive the first actuator position from the section control module and adjust the first actuator by generating one more first actuator commands based on the received first actuator position. The feed control system also includes a second actuator module configured to receive the second actuator position from the section control module and adjust the second actuator by generating one more second actuator commands based on the received second actuator positions.

A method for controlling a spreader that includes a bin, a conveyor, a first actuator, and a second actuator. The method includes receiving a first input, determining a section configuration based on at least the first input, and determining a first actuator position and a second actuator position based on the section configuration. The method also includes receiving a commanded belt speed, determining a target belt speed based on (i) the section configuration and (ii) the commanded belt speed. The method further includes adjusting the first actuator based on the determined first actuator position, adjusting the second actuator based on the determined second actuator position, and adjusting a speed of the conveyor based on the determined target belt speed.

In other features, the spreader includes an operator interface. The method includes receiving an application rate and determining a ground speed based on the section configuration and the application rate. The method also includes displaying, on the operator interface, the ground speed as a suggested vehicle speed.

In further features, the method includes providing the determined ground speed to a vehicle control system of the spreader or a cruise control system of the spreader. The method also includes adjusting, via the vehicle control system or the cruise control system, a travel speed of the spreader based on the determined ground speed.

In other features, the method includes receiving a second input and determining the section configuration based on the first input and the second input. In further features, the first input is a manual section input and the second input is an automated section input.

In other features, adjusting the first actuator includes generating one or more first actuator commands based on the determined first actuator position. Adjusting the second actuator includes generating one or more second actuator commands based on the determined second actuator position.

In yet other features, the first input corresponds to a level of a material in the bin.

A non-transitory computer-readable medium storing processor executable instructions for controlling a spreader that includes a bin, a conveyor, a first actuator, and a second actuator is disclosed. The instructions include receiving a first input, determining a section configuration based on at least the first input, and determining, based on the section configuration, (i) a first actuator position and (ii) a second actuator position. The instructions also include receiving a commanded belt speed and determining a target belt speed based on (i) the section configuration and (ii) the commanded belt speed. The instructions further include adjusting the first actuator based on the determined first actuator position, adjusting the second actuator based on the determined second actuator position, and adjusting a speed of the conveyor based on the determined target belt speed.

In other features, the instructions include receiving an application rate and determining a ground speed based on the section configuration and the application rate. The instructions also include displaying, on an operator interface, the ground speed as a suggested vehicle speed.

In further features, the instructions include providing the determined ground speed to a vehicle control system of the spreader or a cruise control system of the spreader and adjusting, via the vehicle control system or the cruise control system, a travel speed of the spreader based on the determined ground speed.

In other features, the instructions include receiving a second input and determining the section configuration based on the first input and the second input. In further features, the first input is a manual section input and the second input is an automated section input.

In other features, adjusting the first actuator includes generating one or more first actuator commands based on the determined first actuator position. Adjusting the second actuator includes generating one or more second actuator commands based on the determined second actuator position.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 4A is a chart that lists possible section configurations of a feed control system according to the principles of the present disclosure.

FIG. 4B is a chart that lists possible section configuration transitions of a feed control system according to the principles of the present disclosure In the drawings, reference numbers may be reused to identify similar and/or identical elements.

DETAILED DESCRIPTION

Figure 1:
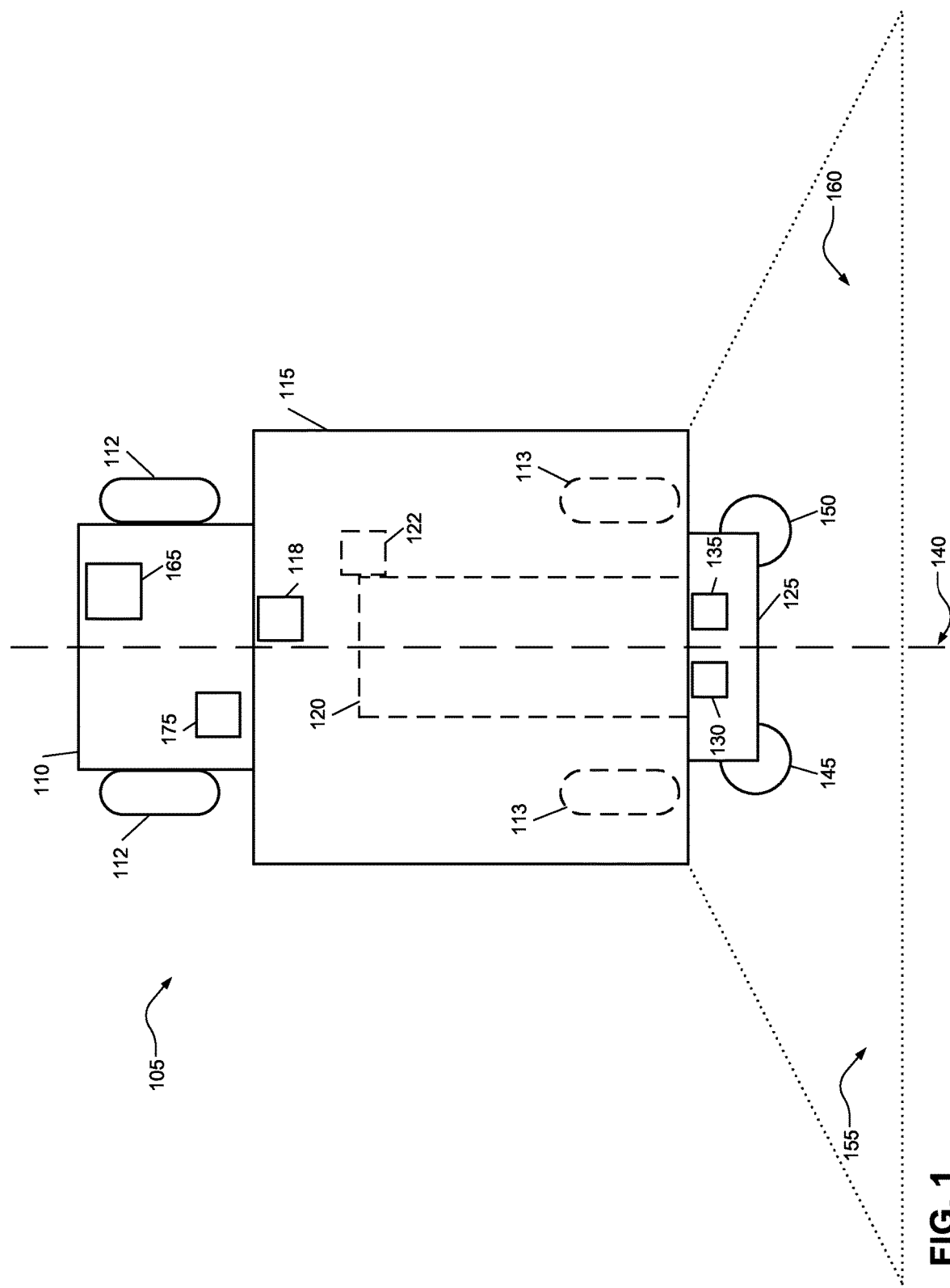
FIG. 1 is functional block diagram of an example spreader including a feed control system according to the principles of the present disclosure.

A spreader typically spreads dry matter (which may be particulate or granular matter, such as fertilizer) on an agricultural field. FIG. 1 is a functional block diagram of an example spreader 105. The spreader 105 includes a chassis (not shown) supported by front ground engaging members 112 and rear ground engaging members 113. Although the front ground engaging members 112 and rear ground engaging members 113 of the spreader 105 are depicted as wheels, other supports are contemplated—for example, tracks. The spreader 105 is adapted for movement through a field.

The spreader 105 includes an operator compartment 110 and a bin 115. The bin 115 holds the dry material which may be top loaded, or otherwise loaded. A material sensor 118 measures the level of dry material in the bin 115. The material sensor 118 may be an optical sensor, a pressure sensor (e.g., a weight sensor), a contact sensor, or another type of sensor capable of measuring one or more levels of the dry material in the bin 115. The material sensor 118 outputs a signal that indicates the measured level of dry material.

A conveyor 120 is located beneath the bin 115 and carries the dry material, as it drops from bin 115 onto the conveyor 120, toward the rear of the spreader 105. A belt motor 122 drivers the conveyor 120. The belt motor 122 may be an electrical motor, a hydraulic motor, or a pneumatic motor. A feed apparatus 125 is located at the rear of the spreader 105 and includes a first gate 130 and a second gate 135. The conveyor 120 carries the dry material to one or more of the gates—i.e., openings—of the feed apparatus 125. In FIG. 1, a center line 140 represents an imaginary center line of the spreader 105. Each gate of the feed apparatus 125 directs the dry material to a broadcasting device—such as a spinning disk—that distributes the dry material over an area behind and to the side of the spreader 105. For example, the first gate 130 feeds a first broadcast device 145 that applies the dry material on the left-side of the spreader 105—i.e., a left section 155—and the second gate 135 feeds a second broadcast device 150 that applies the dry material on the right-side of the spreader—i.e., a right section 160.

The feed apparatus 125 includes a first actuator (not shown) and a second actuator (not shown)—e.g., a set of linear or proportional actuators—that are mechanically connected to a diverter (not shown) through one or more linkages. The first and second actuators may be electrical actuators, hydraulic actuators, pneumatic actuators, or another type of double acting actuator. The diverter is configured to either permit or block the dry material delivered from the conveyor from entering the first gate 130 and the second gate 135. In various implementations, when both the first actuator and second actuator are extended, the diverter permits the dry material to enter both the first gate 130 and the second gate 135. When both the first actuator and the second actuator are retracted, the diverter prevents the dry material from entering either first gate 130 or the second gate 135. When the first actuator is extended and the second actuator is retracted, the diverter permits the dry material to enter the first gate 130 and blocks the dry material from entering the second gate 135. Conversely, when the first actuator is retracted and the second actuator is extended, the diverter blocks the dry material from entering the first gate 130 and permits the dry material to enter the second gate 135. Stated another way, when an actuator is extended, the divider allows dry material to enter the similarly numbered gate, and when an actuator is retracted, the diverter blocks the dry material from entering the similarly numbered gate. In other implementations, extension of an actuator blocks the corresponding gate and retraction of the actuator permits entry into the corresponding gate.

Activation of the first and second actuators may be used to control which gates the dry material is permitted to enter, thus controlling which sections the dry material is applied to. In some implementations, the diverter and the associated linkage are configured in such a way that only one of the first actuator and the second actuator may be activated at a time.

In various other implementations, the first actuator and the second actuator may be activated either simultaneously or sequentially.

An operator interface 165 is positioned in the operator compartment 110. In some implementations, the operator interface 165 includes a display screen—for example, a liquid crystal display (LCD), a light emitting diode (LED) screen, an organic LED (OLED) screen, or a CRT display. The display screen of the operator interface 165 may present, via a graphical user interface (GUI), various features and/or parameters associated with the spreader 105. The operator interface 165 may include one or more user input devices—for example, buttons, switches, encoders, touch screens, and/or levers. An operator of the spreader 105 may adjust various operating parameters of the spreader 105 via the operator interface 165—for example, by actuating one or more of the user input devices.

The spreader 105 also includes a feed control module 175 and a material sensor 118. The feed control module 175 controls application of the dry material by controlling the first actuator, the second actuator, and the belt motor 122. Although the feed control module 175 is depicted being located within the operator compartment 110, the feed control module may be located anywhere on the spreader 105.

In some implementations, material sensor 118, the operator interface 165, the belt motor 122, the first actuator, the second actuator, and the feed control module 175 exchange data—for example, parameters and instructions—via a network, such as a controller area network. The network may include one or more data buses. In other implementations, the feed control module 175 is separately connected to each of the material sensor 118, the operator interface 165, the belt motor 122, the first actuator, and the second actuator. In yet other implementations, the material sensor 118, the operator interface 165, the belt motor 122, the first actuator, the second actuator, and the feed control module 175 are connected by a combination of one or more networks and one or more direct connections therebetween.

Figure 2:
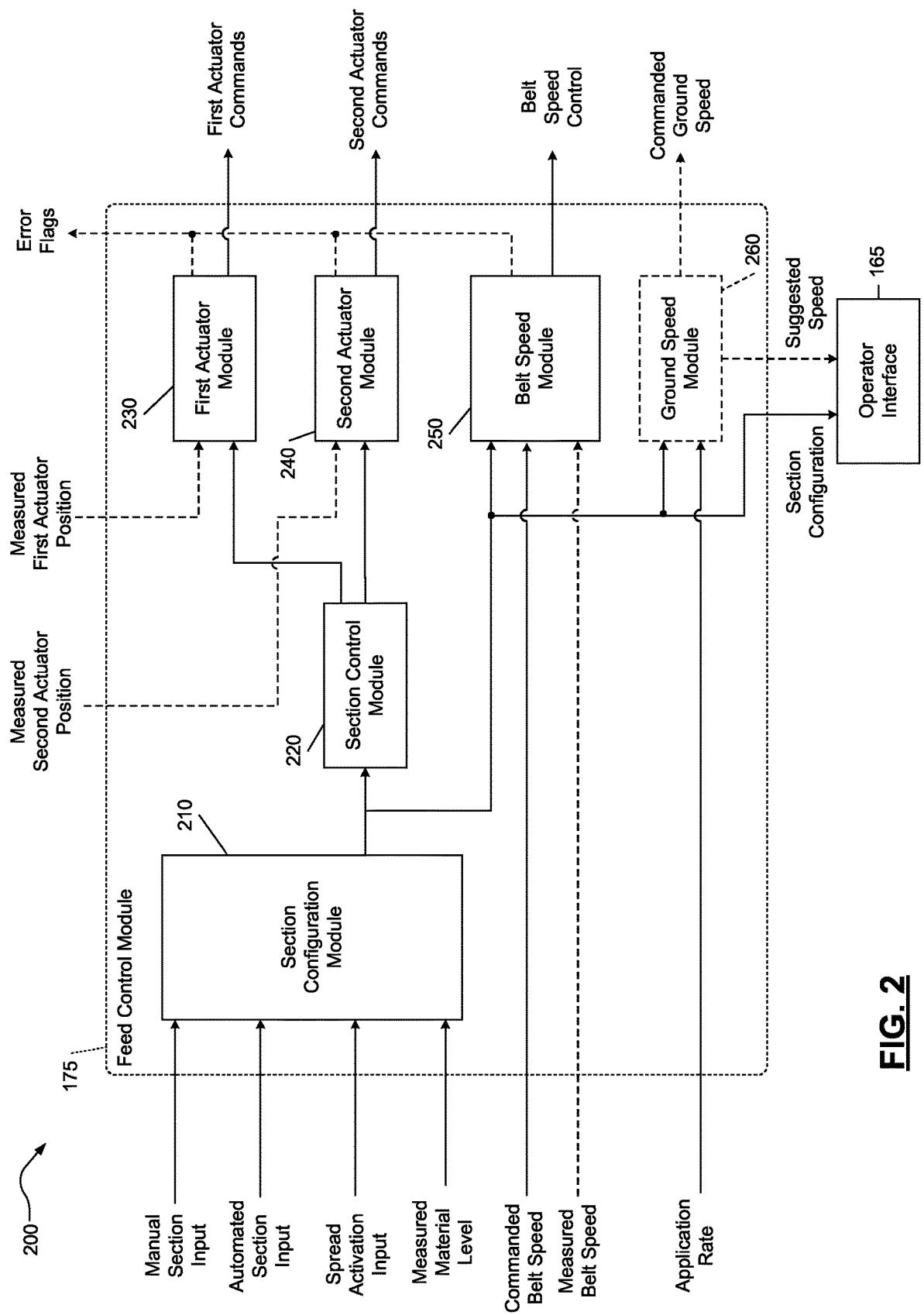
FIG. 2 is a function block diagram of an example implementation of a feed control system according to the principles of the present disclosure.

FIG. 2 is a functional block diagram of an example implementation of a feed control system 200. As shown in FIG. 2, the feed control system 200 may include the feed control module 175 and the operator interface 165. The feed control module includes a section configuration module 210, a section control module 220, a first actuator module 230, a second actuator module 240, and a belt speed module 250.

In various implementations, the feed control module 175 may be a standalone module in the spreader 105, as illustrated in FIG. 1. In other implementations, at least one of the section configuration module 210, the section control module 220, the first actuator module 230, the second actuator module 240, and the belt speed module 250 may be implemented independently or with one or more other modules of the spreader 105—for example, a dry rate controller (DRC) or another suitable control module.

The section configuration module 210 receives a spread activation input and a measured material level. The spread activation input indicates whether the spreader 105 is in a spreading mode—for example, whether the spreader 105 has been commanded to distribute the dry material over an agricultural field. The measured material level indicates the level of dry material currently in the bin 115. In some implementations, the section configuration module 210 receives the measured material level form the material sensor 118. In other implementations, the section configuration module 210 receives the measured material level from another sensor located on the spreader 105 or form an operator of the spreader 105 via the operator interface 165.

The section configuration module 210 also receives a manual section input and an automated section input. The manual section input indicates which sections—e.g., the left section 155 and the right section 160—an operator of the spreader 105 has selected to distribute the dry material on. In some implementations, the operator may provide the manual section input via the operator interface 165. In other implementations, the operator may provide the manual section input via one or more switch, button, lever, or encoder.

The automated section input is received from a map-based automation system and indicates which sections—e.g., the left section 155 and the right section 160—the dry material should be applied to. The map-based automation system indicates which sections to apply the dry material onto, based on one or more application maps of the field and the location of the spreader 105 within the field. As an example only, the section configuration module 210 may receive the automated section input from a Swath Control Pro™ system from Deere and Company or another suitable map-based automation system.

The section configuration module 210 determines which sections the dry material should be applied to and generates an output—i.e., a section configuration—based on the determination. In response to either the spread activation input indicating that the spreader 105 is not in the spreading mode or that the measured material level indicates that the bin 115 is empty, the section configuration module 210 outputs that the dry material should not be applied to either the left section 155 or the right section 160.

In response to the spread activation input indicting that the spreader 105 is in the spreading mode and the measured material level indicates that the bin 115 is not empty, the section configuration module 210 generates the section configuration based on the manual section input and the automated section input. The section configuration module 210 gives priority to the manual section input over the automated section input. For example, the section configuration module 210 outputs that the dry material should be applied to a given section in response to the manual section input indicating so, unless the automated section input indicates that the dry material should not be applied to the section. In response to the manual section input indicating that the dry material should not be applied to a given section, the output of the section configuration module 210 will indicate so regardless of the automated section input.

The section configuration module 210 provides the section configuration to the section control module 220, the belt speed module 250, and the operator interface 165. The operator interface 165 may display the section configuration received from the section configuration module as the current commanded configuration to the operator of the spreader 105.

The section control module 220 determines, based on the received section configuration, whether the first actuator and the second actuator should be extended or retracted. The section control module 220 determines and outputs a first actuator position associated with the first actuator and a second actuator position associated with the section actuator. For example, in response to the section configuration indicating that the dry material should be applied to the left section 155, the section control module 220 determines that the first actuator position is an extended position. Conversely, in response to the section configuration indicating that the dry material should not be applied to the left section 155, the section control module 220 determines that the first actuator position is a retracted position.

The section control module 220 determines the second actuator position in a similar manner. In response to the output of the section configuration module 210 indicating that the dry material should be applied to the right section 160, the section control module 220 determines that second actuator position is an extended position. In response to the section configuration indicating that the dry material should not be applied to the right section 160, the section control module 220 determines that the second actuator position is a retracted position.

In some implementations, the section control module 220 may determine that the first actuator position and the second actuator position are equal to the current position of the first actuator and the second actuator, respectively. For example, in response to determining that the section configuration indicates that the dry material should not be applied to either the left section 155 or the right section 160, the section control module 220 determines that the first actuator should maintain the current position and the second actuator should maintain the current position.

The first actuator module 230 receives the first actuator position from the section control module 220. The first actuator module 230 generates, based on the received first actuator position, one or more control signals—i.e., first actuator commands—to place the first actuator in the first actuator position. When received by the first actuator, the first actuator commands cause the first actuator to either extend, retract, or maintain the current position.

The second actuator module 240 receives the second actuator position from the section control module 220. The second actuator module 240 generates, based on the received second actuator position, one or more control signals—i.e., second actuator commands—to place the second actuator in the second actuator position. When received by the second actuator, the second actuator commands cause the second actuator to either extend, retract, or maintain the current position.

In some implementations, the section control module 220 simultaneously outputs the first actuator position to the first actuator module 230 and the second actuator position to the second actuator module 240. In other implementations, the section control module 220 sequentially outputs the first actuator position and the second actuator position. For example, the section control module 220 may output one of the first actuator position or the second actuator position, start a timer, and then, in response to the timer equaling a delay period, output the other actuator position. The delay period may be a predetermined period of time. For example, the delay may be or correspond to approximately 1 second or 0.5 seconds. Alternatively, the delay period may be set to an initial period of time—for example, 1 second—and the operator of the spreader 105, via the operator interface 165, may change the delay period to another suitable period of time.

The section control module 220 determines which actuator position—i.e., the first actuator position or the second actuator position—to output first based on a section priority. The section priority may indicate that an actuator position that results in the stopping of the application of the dry material on a section is output prior to an actuator position that results in either the starting of application of the dry material on a section or no change in the application of the dry material on a section—i.e., a stopping priority. Alternatively, the section priority may indicate that an actuator position that results in either the starting of application of the dry material on a section or no change in the application of the dry material on a section is output prior to an actuator position that results in the stopping of the application of the dry material on a section—i.e., a starting priority.

In some implementations, the section priority is set to a predetermined priority—i.e., stopping or starting. In other implementations, the section priority may be set to an initial priority value—for example, stopping—and the operator of the spreader 105, via the operator interface 165, may change the section priority value—for example, to starting. The operator may select the stopping priority to conserve the dry material and select the starting priority to ensure the application of dry material in all desired areas of the field.

The belt speed module 250 receives the section configuration output by the section configuration module 210 and a commanded belt speed. The commanded belt speed represents a speed of the belt motor 122 required to deliver sufficient dry material to the feed apparatus 125 to be able to distribute the material on the both the left section 155 and the right section 160 at a currently selected application rate—e.g., pounds of material per acre. The belt speed module 250 determines a belt speed, based on the section configuration and commanded belt speed, and then generates one or more signals—i.e. belt speed control—that cause the belt motor 122 to operate at the determined belt speed. In response to the section configuration indicating that the dry material should be applied to both the left section 155 and the right section 160, the belt speed module 250 determines the belt speed to be the commanded belt speed. In response to the section configuration indicating that the dry material should only be applied to one of the left section 155 and the right section 160, the belt speed module 250 determines that the belt speed is half of the commanded speed. In response to the output of the section configuration module 210 indicating that the material should not be applied to either the left section 155 or the right section 160, the belt speed module 250 determines that the belt speed is zero—i.e., that the conveyor 120 should be stopped and not deliver material to the feed apparatus 125.

In various implementations, the belt speed module 250 receives a measured speed of the conveyor 120. In response to determining that the measured belt conveyor is not within a predetermined speed threshold of the determined belt speed, the belt speed module 250 may generate an error flag—e.g., a diagnostic trouble code (DTC)—associated with belt speed control. For example, the belt speed module 250 may generate a DTC in response to determining that the measured conveyor speed and determined belt speed are not within the speed threshold after a predetermined period of time has elapsed since the belt speed module 250 last instructed a belt speed change.

In some implementations, the manual section input and/or the automated section input may indicate that material should be applied to both the left section 155 and the right section 160 by providing a split percentage for the sections—for example, 25/75, 50/50, 75/25 or any other combination of two values that when summed equal 100. The first and second value of the split percentage refer to the percentage of the dry material delivered to the feed apparatus 125 that is permitted to enter the first feed gate 130 and the second feed gate 135, respectively. In such implementations, the output of the section configuration module 210—i.e., the section configuration—includes the split percentage. In response to receiving a split percentage other than 50/50, the section control module 220 instructs the first actuator module 230 to partially extent or retract the first actuator and/or the second actuator module 240 to partially extend or retract the second actuators. The first actuator position and the second actuator position output by the section control module 220 indicate to what degree the respective actuators should be extended or retracted to result in the corresponding received split percentage.

In some implementations, the section control module 220 includes a lookup table with entries for every possible split percentage and the corresponding first and second actuator positions. The section control module 220 uses the lookup table to determine the first actuator position and the second actuator position. In other implementations that section control module 220 may use a predetermined formula to calculate the first actuator position and the second actuator position based on the received split percentage.

In some implementations, the first actuator module 230 receives a measured position of the first actuator and the second actuator module 240 receives a measured position of the second actuator. The first actuator module 230 and the second actuator module 240 may use the measured actuator positions to command the first actuator and the second actuator, respectively, to one or more positions between fully extended and fully retracted. For example, activation of an actuator may be initiated, the measured position of the actuator may be compared to the corresponding actuator position received from the section control module 220, and activation of the actuator may be stopped in response to determining that the measured position is equal to the position received from the section control module 220.

In response to determining that the measured actuator position is not within a predetermined position threshold of the actuator position received from the section control module 220, the first actuator module 230 and the second actuator module 240 may generate actuator error flags—for example, a first actuator DTC and a second actuator DTC, respectively. For example in response to determining that the measured position and the received position are not with in the position threshold after a predetermined period of time has elapsed since the section control module last instructed a position change.

In various implementations, the feed control module 175 includes a ground speed module 260. The ground speed module 260 receives the section configuration from the section configuration module 210 and an indication of a current application rate of the spreader 105. The ground speed module 260 determines one or more ground speeds that the spreader 105 may travel at while applying the dry material on the sections indicated by the section configuration at the received application rate. The ground speed module 260 provides the determined speed as a suggested speed to the operator interface 165. The operator interface 165 may display the suggested speed to the operator of the spreader 105. In some implementations, the ground speed module 260 provides the determined speed to a vehicle control system—for example, a cruise control system—that regulates the travel speed of the spreader 105. The vehicle control system may adjust the speed of the spreader to match the speed provided by the ground speed module 260.

In various implementations, the ground speed module 260 includes a lookup table with entries for one or more possible application rate and section configuration combinations. Each entry in the lookup table includes one or more ground speeds that correspond to an application rate and section configuration combination. The ground speed module 260 uses the lookup table to determine the ground speed. In yet other implementations, the ground speed module 260 uses a predetermined formula to generate the ground speed.

Figure 3A:
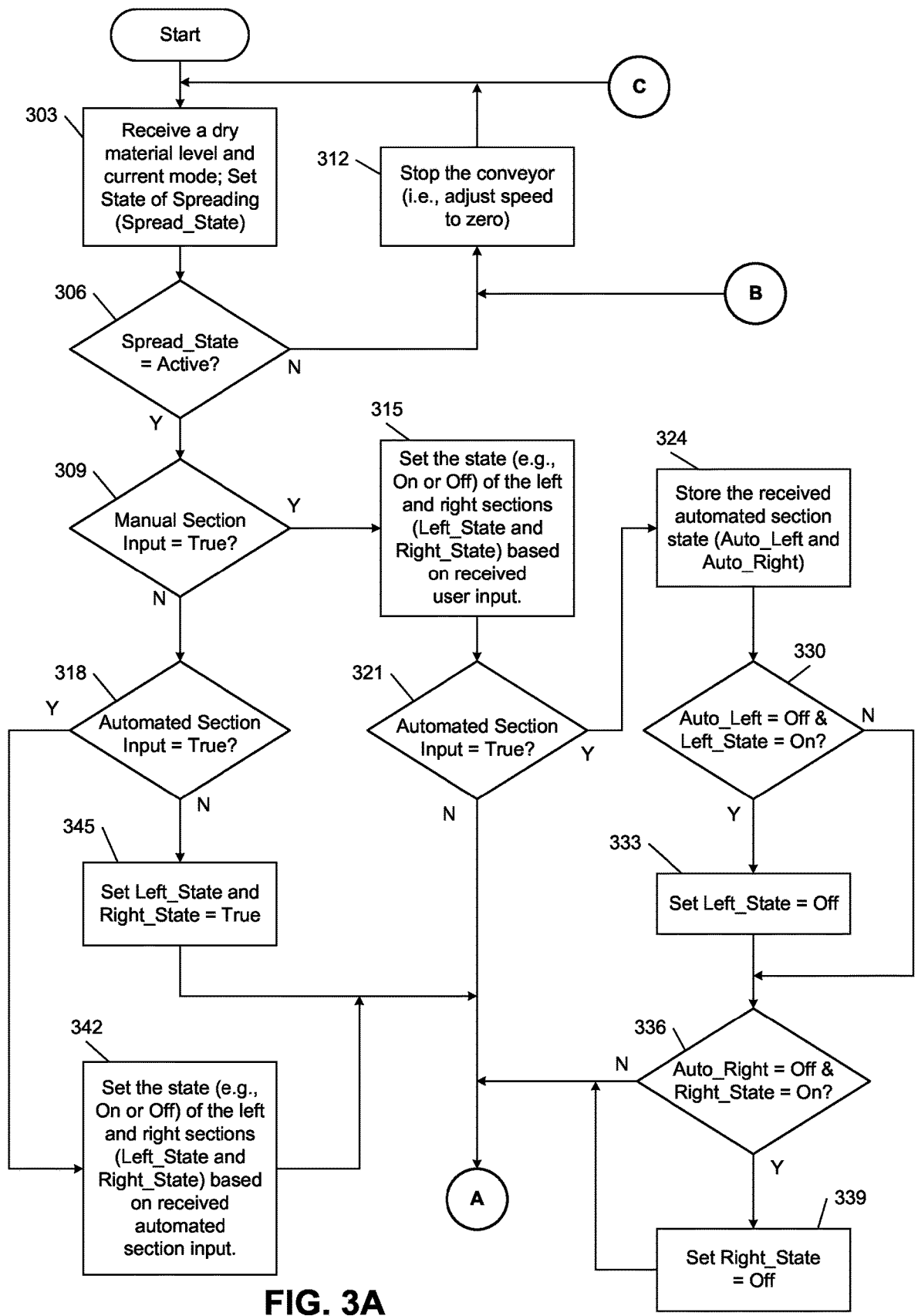
FIGS. 3A and 3B are a flowchart of example operations performed by an implementation of a feed control system according to the principles of the present disclosure.
Figure 3B:
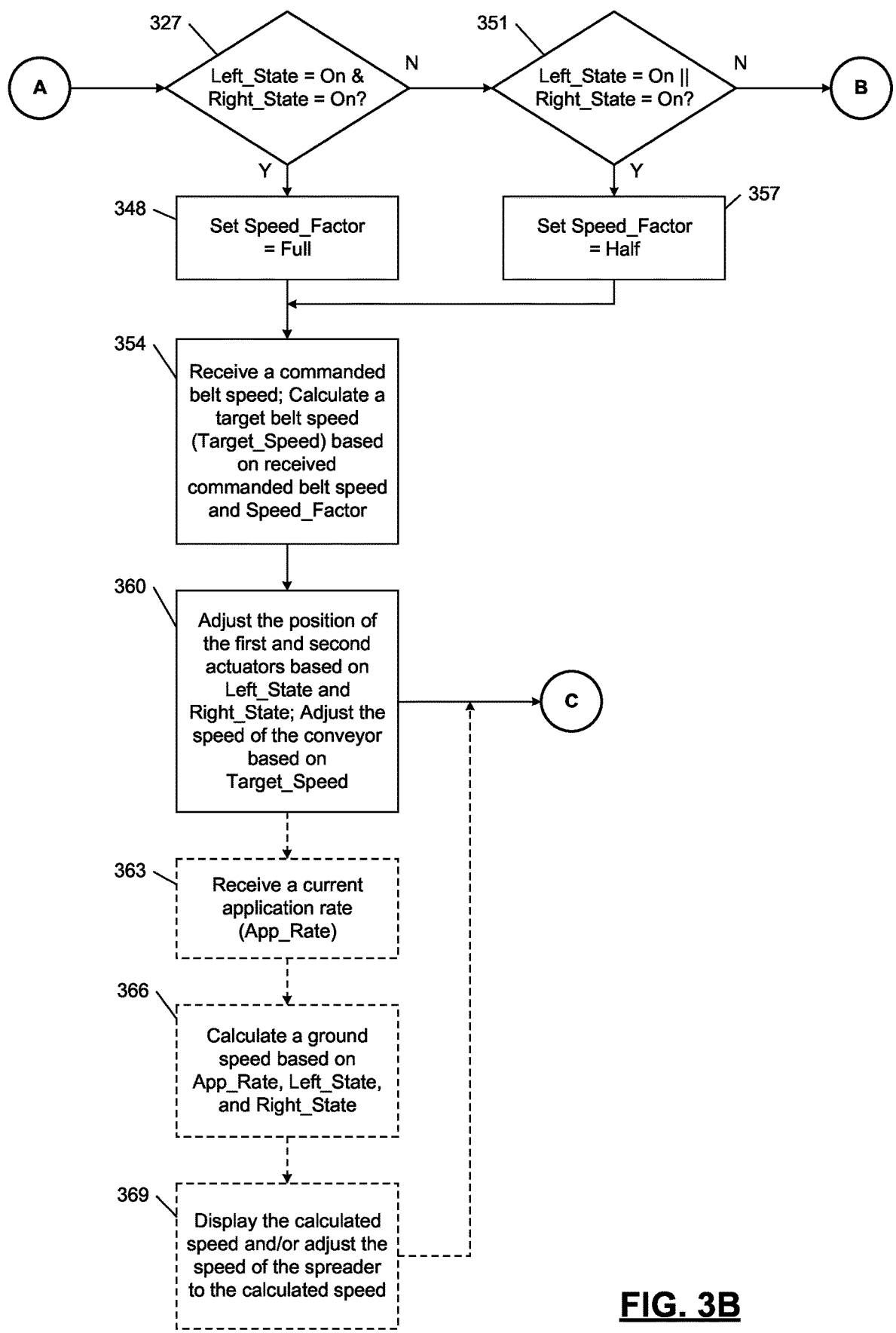

FIGS. 3A-3B are a flowchart depicting an example method of controlling the feeding of material in dry box spreader, such as the spreader 105. In an example implementation, control may be performed by the feed control system 200. In other implementations, control may be performed by a dry rate controller (DRC) of the spreader 105.

Control begins at 303 of FIG. 3A upon startup (e.g., power on) of the spreader 105. At 303, control receives an indication of the level of dry material in the bin 115 and a current mode of the spreader 105—i.e., an operator is using the spreader 105 to apply dry material to an agricultural field. Control sets a current state of the spreader (Spread_State) based on the level of the dry material and the current mode. For example, in response to the current mode being spreading and the level of dry material being any value other than empty, control sets Spread_State to Active. At 306, control determines whether the spreader 105 is currently applying dry material—for example, Spread_State is equal to Active. If so, control continues with 309; otherwise, control transfers to 312. At 312, control stops the conveyor. For example, control adjusts the speed of the belt motor 122 to zero. Control then returns to 303.

At 309, control determines whether a manual section input indicating a section configuration has been received from the operator of the spreader 105. If so, control continues to 315; otherwise, control transfers to 315. At 315, control sets the application state of the left section 155 (Left_State) and the right section 160 (Right_State) based on the received manual section input. Control then progresses to 312, where control determines whether an automated section input has been received. For example, control determines whether a map-based automation system has provided a section input to the feed control module 175. If so, control continues with 324; otherwise, control transfers to 327 of FIG. 3B.

At 324, control stores the received automated section input. For example, control sets Auto_Left and Auto Right to the values indicated in the automated section input. Control progress to 330, where control determines whether the manual section input indicates that the dry material should be applied to the left section 155 and the automated section input indicates that the dry material should not be applied to the left section 155. If so, control continues with 333; otherwise, control transfers to 336. At 333, control sets the application state for the left section 155 to Off and control progresses to 336.

At 336, control determines whether the manual section input indicates that the dry material should be applied to the right section 160 and the automated section input indicates that the dry material should not be applied to the right section 160. If so, control continues with 339; otherwise, control transfers to 327 of FIG. 3B. At 339, control sets the application state for the right section 160 to Off and control progresses to 327 of FIG. 3B.

Returning to 318 of FIG. 3A, control determines whether an automated section input has been received. If so, control continues with 342, where control sets the application state of the left section 155 (Left_State) and the right section 160 (Right_State) based on the received automated section input. Control then continues with 327 of FIG. 3B. If control determines at 318 that an automated section input has not been received, control transfers to 345. At 345, control sets the application states of the left section 155 (Left_State) and the right section 160 (Right_State) to On. Control then progresses to 327 of FIG. 3B.

At 327 of FIG. 3B, control determines whether the dry material should be applied to both the left section 155 and the right section 160. For example, control determines whether both Left_State and Right_State are equal to On. If so, control continues with 348. At 348, control sets a belt speed factor (Speed_Factor) to Full. Control then progresses to 354.

If at 327 control determine that both Left_State and Right_State are not equal to On, control transfers to 351. At 351, control determines whether the dry material should be applied to either the left section 155 or the right section 160. For example, control determines whether either Left_State or Right_State are equal to On. If not, control transfers to 312 of FIG. 3A; otherwise, control continues with 357. At 357, control sets the belt speed factor (Speed_Factor) to Half. Control then progresses to 354.

At 354, control receives a commanded belt speed. Control then calculates a target belt speed (Target_Speed) for the conveyor 120 based on the commanded belt speed and the belt speed factor (Speed_Factor). For example, control sets Target_Speed to either the commanded speed or half of the commanded speed. Control then continues with 360.

At 360, control adjusts the positions of the first actuator and the second actuator based on the application state of the left section 155 (Left_State) and the right section 160 (Right_State). For example, control may either extend to retract the first actuator and the second actuator based on the value of Left_State and Right_State, respectively. Control may adjust the first actuator and the second actuator simultaneously. Alternatively, control may sequentially adjust the first actuator and the second actuator based on a delay and a section priority, as described above.

In some implementations, control then returns to 303 of FIG. 3A. In other implementations—for example, when the feed control module 175 includes the ground speed module 260—control continues with 363, where control receives a current application rate (App_Rate) of the spreader 105. At 366, control calculates a ground speed for the spreader 105 based on the received application rate (App_Rate) and the application state of the left section 155 (Left_State) and the right section 160 (Right_State). Control may use a lookup table or a predetermined formula to calculate the ground speed. Control then continues with 369.

At 369, control displays the calculated ground speed to the operator of the spreader 105. For example, control may cause the calculated ground speed to be displayed as a suggested speed on the operator interface 165. Control may also adjust the speed of the spreader 105 by providing the calculated ground speed to a vehicle control system—for example, a cruise control system—that regulates a travel speed of the spreader 105. Control then returns to 303 of FIG. 3A.

FIG. 4A depicts a first chart 410 that lists the possible section configurations of the feed control system 200—i.e., output of the section configuration module 210. In FIG. 4A, each unique section configuration corresponds to a different State. FIG. 4B depicts a second chart 420 that lists possible section configuration transitions that may occur in one implementation of the feed control system 200. The second chart 420 indicates whether a delay is required or if the belt speed should be set to zero (0) when transitioning from one possible section configuration—i.e., State—to another.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A feed control system for a spreader comprising:
   a section configuration module configured to output a section configuration;
   a section control module configured to:
     receive the section configuration,
     determine a first actuator position based on the section configuration, and
     determine a second actuator position based on the section configuration; and
   a belt speed module configured to:
     receive the section configuration,
     receive a commanded belt speed, and
     determine a target belt speed based on (i) the section configuration and (ii) the commanded belt speed.

2. The feed control system of claim 1 further comprising:
   a ground speed module configured to:
     receive (i) an application rate and (ii) the section configuration, and
     determine and output a ground speed based on the (i) the application rate and (ii) the section configuration; and
   an operator interface that includes a display, wherein the operator interface in configured to receive the determined ground speed and present the speed as a suggested speed on the display.

3. The feed control system of claim 2, wherein the ground speed module is configured to adjust a travel speed of the spreader by providing the determined ground speed to a vehicle control system of the spreader or a cruise control system of the spreader.

4. The feed control system of claim 1 wherein the section configuration module is configured to:
   receive (i) a first input and (ii) a second input; and
   generate the section configuration based on (i) the first input and (ii) the second input.

5. The feed control system of claim 4 wherein the first input is a manual section input and the second input is an automated section input.

6. The feed control system of claim 4 wherein the section configuration module is configured to in response to determining that the first input indicates that (i) the spreader is in an application mode or (ii) a bin of the spreader is not empty, generate the section configuration based on the second input.

7. The feed control system of claim 1 wherein the spreader includes a first actuator and a second actuator, the feed control system further comprising:
   a first actuator module configured to:

receive the first actuator position from the section control module, and adjust the first actuator by generating one more first actuator commands based on the received first actuator position; and a second actuator module configured to:

receive the second actuator position from the section control module, and adjust the second actuator by generating one more second actuator commands based on the received second actuator positions.

8. A method for controlling a spreader that includes a bin, a conveyor, a first actuator, and a second actuator, the method comprising:

receiving a first input;

determining a section configuration based on at least the first input;

determining a first actuator position and a second actuator position based on the section configuration;

receiving a commanded belt speed;

determining a target belt speed based on (i) the section configuration and (ii) the commanded belt speed;

adjusting the first actuator based on the determined first actuator position;

adjusting the second actuator based on the determined second actuator position; and adjusting a speed of the conveyor based on the determined target belt speed.

9. The method of claim 8 wherein the spreader includes an operator interface, the method further comprising:

receiving an application rate;

determining a ground speed based on the section configuration and the application rate; and displaying, on the operator interface, the ground speed as a suggested vehicle speed.

10. The method of claim 9 further comprising:

providing the determined ground speed to a vehicle control system of the spreader or a cruise control system of the spreader; and adjusting, via the vehicle control system or the cruise control system, a travel speed of the spreader based on the determined ground speed.

11. The method of claim 8 further comprising:

receiving a second input; and determining the section configuration based on the first input and the second input.

12. The method of claim 11, wherein the first input is a manual section input and the second input is an automated section input.

13. The method of claim 8, wherein:

adjusting the first actuator includes generating one or more first actuator commands based on the determined first actuator position; and adjusting the second actuator includes generating one or more second actuator commands based on the determined second actuator position.

14. The method of claim 8, wherein the first input corresponds to a level of a material in the bin.

15. A non-transitory computer-readable medium storing processor executable instructions for controlling a spreader that includes a bin, a conveyor, a first actuator, and a second actuator, the instructions comprising:

receiving a first input;

determining a section configuration based on at least the first input;

determining, based on the section configuration, (i) a first actuator position and (ii) a second actuator position;

receiving a commanded belt speed;

determining a target belt speed based on (i) the section configuration and (ii) the commanded belt speed;

adjusting the first actuator based on the determined first actuator position;

adjusting the second actuator based on the determined second actuator position; and adjusting a speed of the conveyor based on the determined target belt speed.

16. The non-transitory computer-readable medium of claim 15, the instructions further comprising:

receiving an application rate;

determining a ground speed based on the section configuration and the application rate; and displaying, on an operator interface, the ground speed as a suggested vehicle speed.

17. The non-transitory computer-readable medium of claim 16, the instructions further comprising:

providing the determined ground speed to a vehicle control system of the spreader or a cruise control system of the spreader; and adjusting, via the vehicle control system or the cruise control system, a travel speed of the spreader based on the determined ground speed.

18. The non-transitory computer-readable medium of claim 15, the instructions further comprising:

receiving a second input; and determining the section configuration based on the first input and the second input.

19. The non-transitory computer-readable medium of claim 18, wherein the first input is a manual section input and the second input is an automated section input.

20. The non-transitory computer-readable medium of claim 15, wherein:

adjusting the first actuator includes generating one or more first actuator commands based on the determined first actuator position; and adjusting the second actuator includes generating one or more second actuator commands based on the determined second actuator position.

\* \* \* \* \*